United States Patent [19]
Zahn et al.

[11] Patent Number: 5,726,398
[45] Date of Patent: Mar. 10, 1998

[54] AUTOMOTIVE BUMPER AND MUFFLER COMBINATION

[75] Inventors: Wolfgang Zahn, Ludwigsburg, Germany; Jon W. Harwood, Toledo, Ohio

[73] Assignee: AP Parts Manufacturing Company, Toledo, Ohio

[21] Appl. No.: 806,990

[22] Filed: Feb. 26, 1997

[51] Int. Cl.⁶ .................................................. F01N 7/18
[52] U.S. Cl. .......................... 181/282; 181/272; 181/276
[58] Field of Search ................................. 181/266, 267, 181/268, 269, 272, 276, 282; 180/89.2, 309, 68.3

[56] References Cited

U.S. PATENT DOCUMENTS

| | | |
|---|---|---|
| 33,370 | 10/1861 | Harwood . |
| D. 363,908 | 11/1995 | Maag . |
| 2,658,580 | 11/1953 | Trembley . |
| 4,700,806 | 10/1987 | Harwood . |
| 4,736,817 | 4/1988 | Harwood . |
| 4,759,423 | 7/1988 | Harwood et al. . |
| 4,760,894 | 8/1988 | Harwood et al. . |
| 4,765,437 | 8/1988 | Harwood et al. . |
| 4,821,840 | 4/1989 | Harwood et al. . |
| 4,836,330 | 6/1989 | Harwood et al. . |
| 4,847,965 | 7/1989 | Harwood et al. . |
| 4,860,853 | 8/1989 | Moring, III . |
| 4,894,987 | 1/1990 | Harwood et al. . |
| 4,901,815 | 2/1990 | Harwood et al. . |
| 4,901,816 | 2/1990 | Garey . |
| 4,905,791 | 3/1990 | Garey . |
| 4,909,348 | 3/1990 | Harwood et al. . |
| 4,924,968 | 5/1990 | Moring, III et al. . |
| 4,928,372 | 5/1990 | Harwood et al. . |
| 4,958,701 | 9/1990 | Moring, III . |
| 5,004,069 | 4/1991 | Van Blaircum et al. . |
| 5,029,668 | 7/1991 | Murakawa et al. .......... 181/282 X |
| 5,042,125 | 8/1991 | Harwood et al. . |
| 5,096,010 | 3/1992 | Ojala et al. .................. 180/68.3 |
| 5,164,551 | 11/1992 | Harwood et al. . |
| 5,173,577 | 12/1992 | Clegg et al. . |
| 5,252,788 | 10/1993 | Emrick et al. . |
| 5,327,722 | 7/1994 | Clegg et al. . |
| 5,428,194 | 6/1995 | Emrick et al. . |
| 5,448,831 | 9/1995 | Harwood . |
| 5,473,891 | 12/1995 | Baxter et al. . |
| 5,563,383 | 10/1996 | Harwood . |
| 5,563,385 | 10/1996 | Harwood . |
| 5,597,986 | 1/1997 | Harwood et al. . |

Primary Examiner—Khanh Dang
Attorney, Agent, or Firm—Dickinson, Wright, Moon, Van Dusen & Freeman

[57] ABSTRACT

A bumper/muffler assembly is provided to simultaneously perform noise attenuation functions and impact protection for an automotive vehicle. The bumper/muffler assembly is formed at least in part from stamped sheets of metal. The sheets include an internal plate formed with inlet and outlet channels therein. Inlet and outlet tube plates are secured to portions of the internal plate adjacent the inlet and outlet channels such that inlet and outlet tubes are defined. A front external shell is disposed in proximity to the rear end of the vehicle and is configured to be spaced from portions of the internal plate to define a front chamber. A rear external shell also is spaced from the internal plate to define a rear chamber. A plastic material may be nested over the rear external shell for aesthetic attractiveness of the assembly.

14 Claims, 7 Drawing Sheets

AUTOMOTIVE BUMPER AND MUFFLER COMBINATION

BACKGROUND OF THE INVENTION

1. Field of the Invention

The subject invention relates to a rear bumper for an automotive vehicle that accommodates an exhaust muffler therein.

2. Description of the Prior Art

The typical prior art exhaust system includes at least one exhaust pipe extending from a manifold on an engine to a catalytic converter. A downstream exhaust pipe extends from the catalytic converter to an exhaust muffler, and a tail pipe extends from the muffler to a location near the rear end of the vehicle from which exhaust gas may be safely emitted. The exhaust muffler functions to attenuate the noise associated with the flowing exhaust gas by passing the exhaust gas through perforated tubes which, in turn, pass through enclosed chambers. The perforations permit a controlled expansion of the exhaust gas into the chambers, and thereby permit the sound energy to be dissipated.

It is generally easier to attenuate noise with a large muffler than with a small muffler. However, the exhaust muffler must compete with other vehicle needs for the limited available space. For example, the exhaust muffler typically is located near the rear of the vehicle to avoid a significant intrusion into the space required to carry passengers. The location of the exhaust muffler rearwardly of the passenger compartment typically is at the expense of space that would otherwise be allotted to the trunk or fuel tank.

Muffler placement has been further complicated by shape constraints of the typical prior art muffler. In particular, the typical prior art muffler includes parallel pipes supported in a tubular outer shell by transverse baffles. Prior art mufflers with a tubular outer shell must be accommodated in a correspondingly configured space on the underside of the vehicle. However, drive shafts, axles, suspension systems, fuel tanks and spare tire wells rarely leave a large semi-cylindrical space for the conventional prior art muffler with a tubular outer shell.

Some vehicle manufacturers merely suspend the prior art muffler at a convenient location. These prior art mufflers usually are visible from the rear of the vehicle.

Many vehicle manufacturers are very sensitive to the aesthetic appearance of their vehicles, and exhaust system components are considered to be aesthetically unattractive. Consequently, many vehicle manufacturers require the exhaust muffler to be placed in a visually unobtrusive location.

The more recent prior art includes significant improvements in mufflers made at least partly from formed sheets of metal. A prior art stamped formed muffler typically includes a pair of juxtaposed internal plates that are formed to define an array of tubes therebetween. A pair of external shells are secured around the internal plates and define chambers that communicate with the tubes. Stamp formed mufflers are not confined to a tubular shape as with the above-described prior art muffler having a conventional wrapped outer shell. Rather, the external shells of a stamp formed muffler can be formed to match the available space on the underside of a vehicle. A prior art stamp formed muffler with a conformal outer shell is shown, for example, in U.S. Pat. No. 4,821,840. Use of stamp formed outer shells facilitates the unobtrusive placement of a muffler. However, even a conformal stamp formed muffler must compete with other space needs on the vehicle.

U.S. Pat. No. 2,658,580 shows an exhaust muffler formed from a thick casing of metal having a plurality of external fins. The muffler is mounted transversely across the lower front of the vehicle directly below the front bumper. Thus, movement of the vehicle causes cooling air to flow in direct contact with the fins. The cooled exhaust gas flows from the muffler through a tail pipe that extends the entire length of the vehicle. The prior art muffler shown in U.S. Pat. No. 2,658,580 would be visually very obtrusive. Additionally, the muffler design shown in U.S. Pat. No. 2,658,580 presumably was conceived prior to the widespread use of catalytic converters. It is not clear how a catalytic converter could be incorporated into the space between the engine and the exhaust system. Furthermore, the exhaust system shown in U.S. Pat. No. 2,658,580 would appear to present significant heat expansion problems. In this regard, conventional prior art exhaust systems are suspended by hangers from the underside of the vehicle. The hangers permit the exhaust system to thermally expand when the engine is running and to cool when the engine is stopped. The exhaust system disclosed in U.S. Pat. No. 2,658,580 makes no mention of how thermal expansion could be accommodated in pipes extending from the rigidly mounted engine to the rigidly mounted muffler.

In view of the above, it is an object of the subject invention to provide an exhaust muffler that does not detract from the space that can be utilized by other needs of the vehicle.

It is another object of the subject invention to provide an exhaust muffler that is visually unobtrusive.

A further object of the subject invention is to provide an exhaust system that can accommodate thermal expansion.

SUMMARY OF THE INVENTION

The subject invention is directed to an exhaust muffler incorporated directly into the rear bumper of a vehicle and extending substantially the width of the vehicle. The exhaust muffler is formed from a plurality of sheets of material that are formed into selected shapes to define flow passages therebetween. The sheets may be metal and may be formed by stamping, hydroforming, magnetic forming, explosive forming or other known metal formation techniques.

The bumper/muffler assembly of the subject invention may include internal plates that are stamped or otherwise formed into partly congruent shapes to enable portions of the internal plates to substantially nest with one another. However, at least one of the internal plates may be formed with channels that are spaced from the opposed plate. The internal plates may be formed with registered channels extending away from one another and defining exhaust gas flow passages therebetween. The exhaust gas flow passages effectively function as tubes, and will be referred to as tubes herein.

The internal plates preferably define at least one inlet tube for permitting exhaust gas communication into the bumper/muffler assembly and at least one outlet tube for permitting exhaust gas flow from the bumper/muffler assembly. At least one additional tube or chamber may be formed by the internal plates to achieve gas communication between the inlet and outlet tubes. Alternatively, chambers, louvers or other such gas communication means may be provided through the nested internal plates to achieve a preferred gas flow pattern as described further herein.

The internal plate of the bumper/muffler assembly may include a single large internal plate that may be formed to define at least one inlet channel, at least one outlet channel and/or at least one gas communication means therebetween. The internal plates may further include at least one smaller inlet tube plate and at least one smaller outlet tube plate. The inlet tube plate may be formed to define at least one flange that is configured to nest with portions of the single internal plate adjacent the inlet channels therein. Similarly, the outlet tube plate may be formed to define at least one flange configured to nest with portions of the single internal plate adjacent the outlet channel. Thus, inlet and outlet tubes are defined between the single internal plate and the respective inlet and outlet tube plates. The inlet and outlet tube plates weigh less than an entire second internal plate.

The bumper/muffler assembly of the subject invention further includes external shells. The external shells include peripheral flanges dimensioned and configured for registration and nesting with peripheral regions on opposite faces of at least one internal plate. Portions of one external shell disposed inwardly from the peripheral regions thereof may be configured for nesting with a rear support surface of the vehicle. Additionally, portions of both external shell disposed inwardly from the peripheral flanges thereof are configured to be in spaced relationship to the internal plate when the external shell and the internal plate are connected with one another. Thus, chambers may be defined between the external shells and the internal plate and in surrounding relationship to at least portions of the inlet tube and outlet tube defined by the plates. The chambers may communicate with at least one of the inlet and outlet tubes through perforations, apertures, cut-outs or other gas communication means formed in the internal plate and/or in the inlet or outlet tube plates. One external shell may be contoured for an aesthetically attractive and functionally efficient rear bumper.

The bumper/muffler assembly may further include a heat and/or noise insulating material disposed in at least one of the chambers. The bumper/muffler assembly of the subject invention may further include a formed plastic layer nested over at least one external shell. The plastic nested over the external shell may be color coordinated with the body of the vehicle and provides a desirable aesthetic appearance for the bumper/muffler. The bumper/muffler assembly may further include external heat insulation material between the front external shell and the body of the vehicle.

The bumper/muffler assembly of the subject invention may be rigidly mounted to the rear of the vehicle or may be mounted to a shock absorber which in turn is mounted to the rear of the vehicle. The shock absorber ensures that the bumper/muffler assembly meets low speed/low impact crash requirements, such as the five mile per hour crash standard currently required in some parts of the world. Additional crash resistance may be provided by forming the front and/or rear external shells from a gauge of metal material heavier than the minimal thickness required for and commonly used in an exhaust muffler. Alternatively, the muffler with lighter gauge front and rear external shells may be packaged within a conventional sturdier muffler used on some vehicles.

As noted above, exhaust pipes and tail pipes undergo thermal expansion in response to heated exhaust gas. Thermal expansion may cause an exhaust pipe to expand approximately one inch along its length. Conventional exhaust systems, including conventional mufflers thereof, typically are mounted by hangers that accommodate this thermal expansion. A muffler incorporated to a rear bumper, however, cannot freely move with the thermally expanded exhaust pipe. As a result, the bumper/muffler assembly of the subject invention may include a slip joint between the exhaust pipe from the engine and the bumper/muffler assembly. The slip joint may include an annular channel of generally U-shape cross-section extending around the inlet of the muffler. A heat resistant seal may be trapped in the channel and may be dimensioned to closely engage the outer circumference of the exhaust pipe. The seal permits sliding movement of the exhaust pipe further into the engine in response to thermal expansion. The seal also permits movement of the bumper/muffler assembly over the exhaust pipe in response to an impact.

DETAILED DESCRIPTION OF THE PREFERRED EMBODIMENTS

Figure 1:
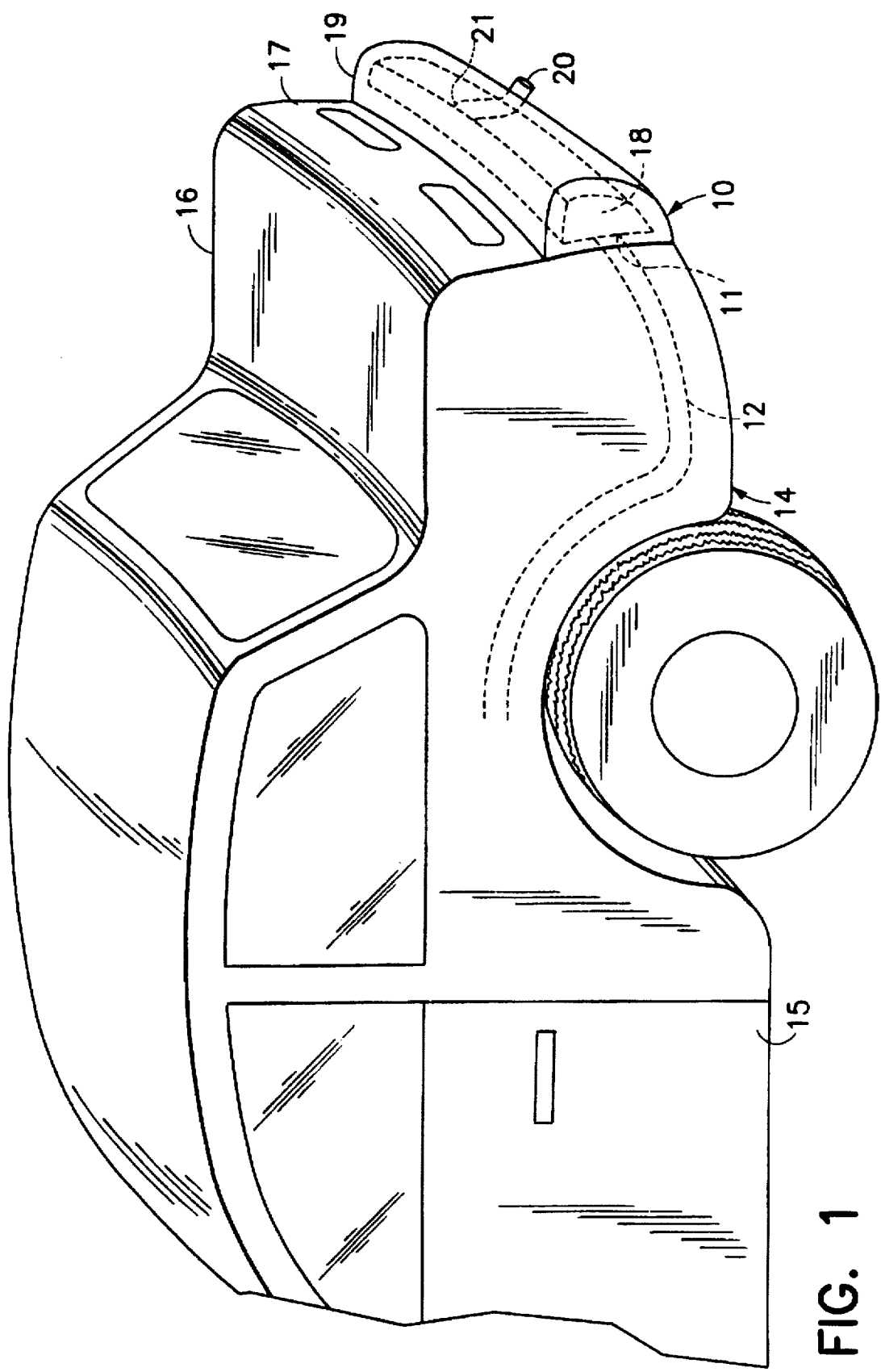
FIG. 1 is a schematic perspective view of a rear end of a vehicle having a rear bumper/muffler combination of the subject invention.
Figure 2:
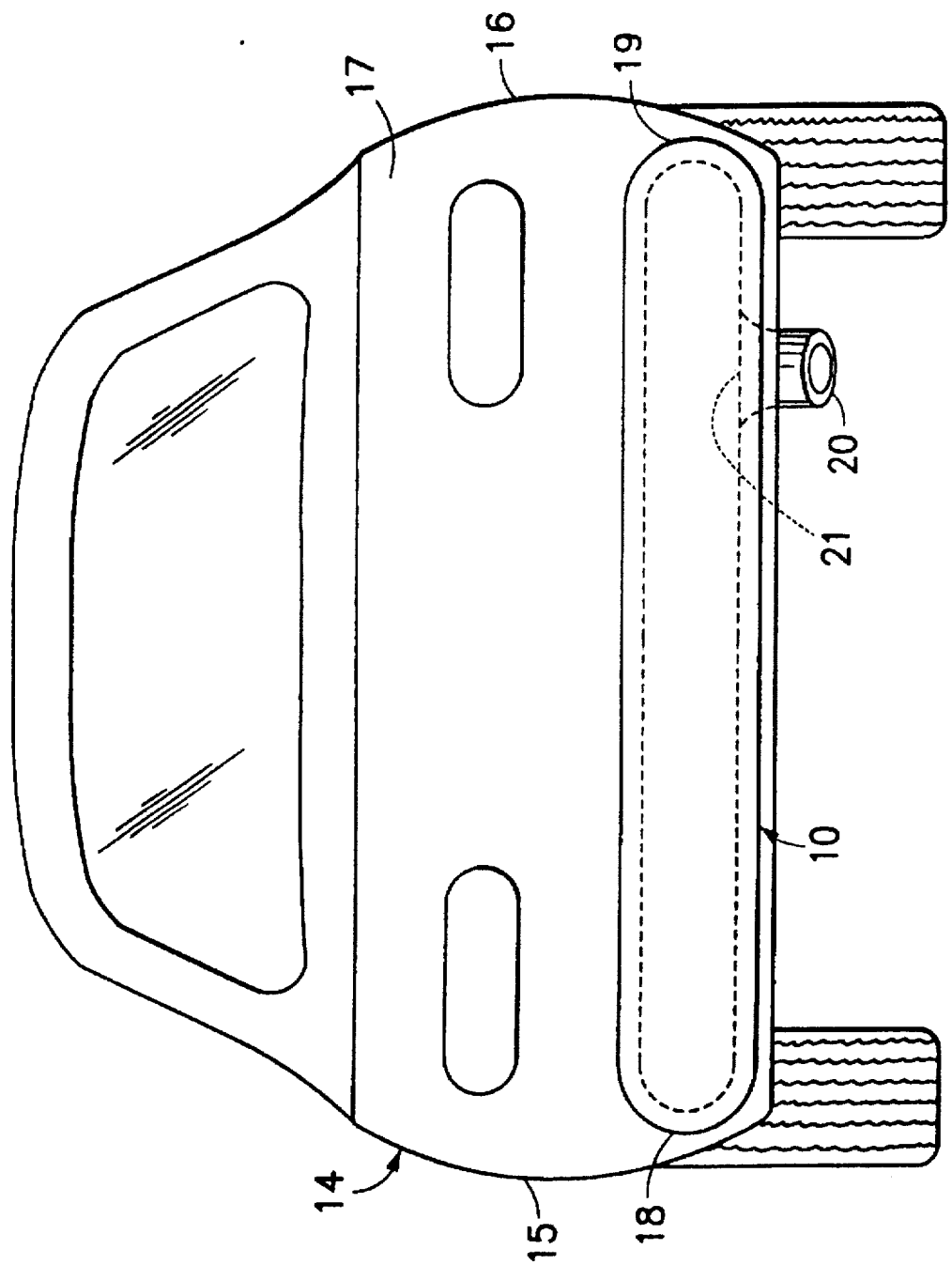
FIG. 2 is a schematic rear view of the vehicle having the bumper/muffler assembly.

A bumper/muffler assembly in accordance with the subject invention is illustrated schematically in FIGS. 1 and 2 and is identified generally by the numeral 10. The bumper/muffler assembly 10 includes an inlet 11 connected to a prior art exhaust pipe 12 extending from an engine (not shown) on a vehicle 14. The vehicle 14 includes opposed sides 15 and 16 and a rear end 17. The bumper/muffler assembly 10 is an elongate structure with opposed ends 18 and 19 disposed at the respective sides 15 and 16 of the vehicle 14. A short tail pipe 20 extends from an outlet 21 of the bumper/muffler assembly 10 and enables emission of the exhaust gas at a selected safe location.

Figure 3:
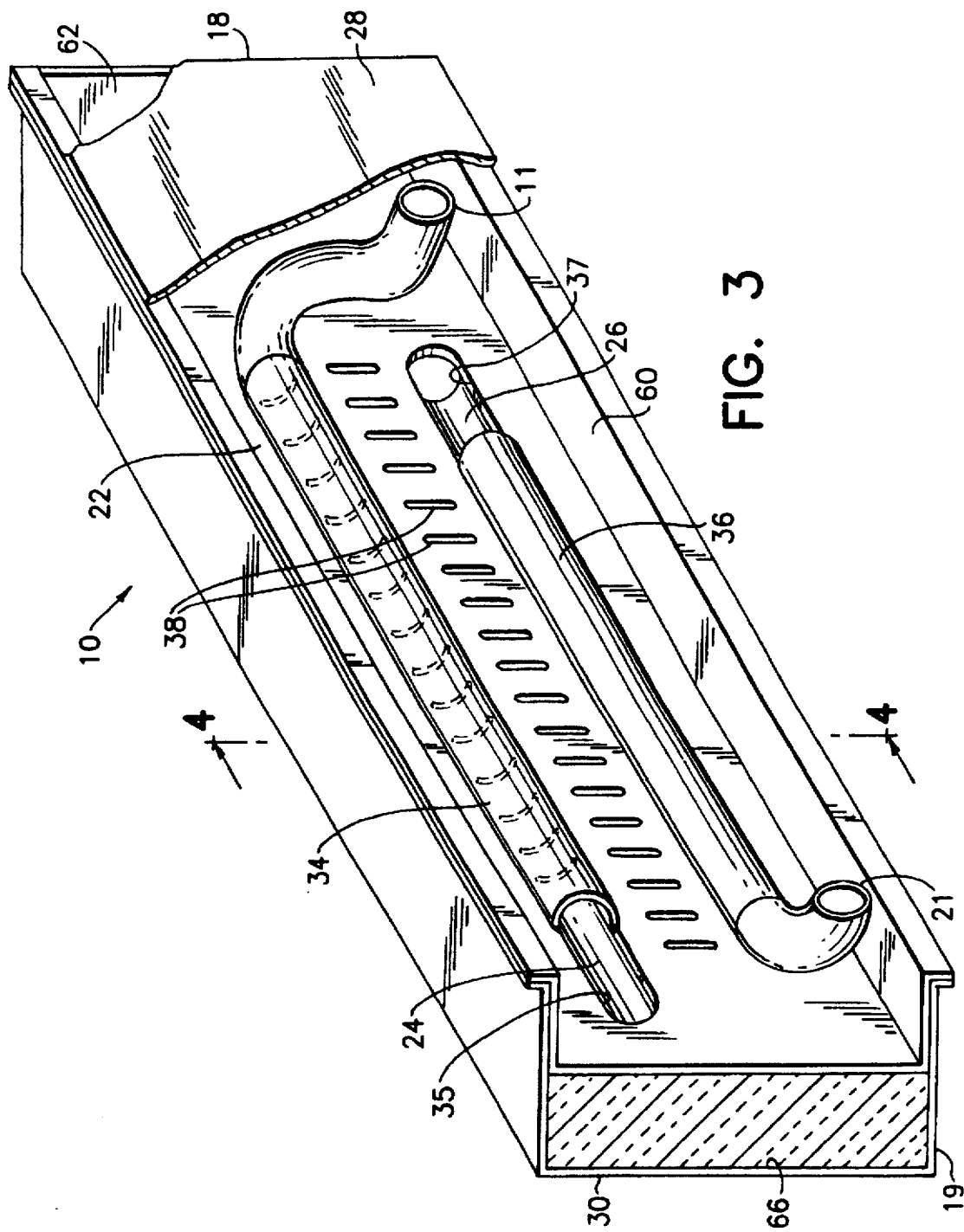
FIG. 3 is a perspective view, partly in section, schematically showing a bumper/muffler in accordance with the subject invention.
Figure 4:
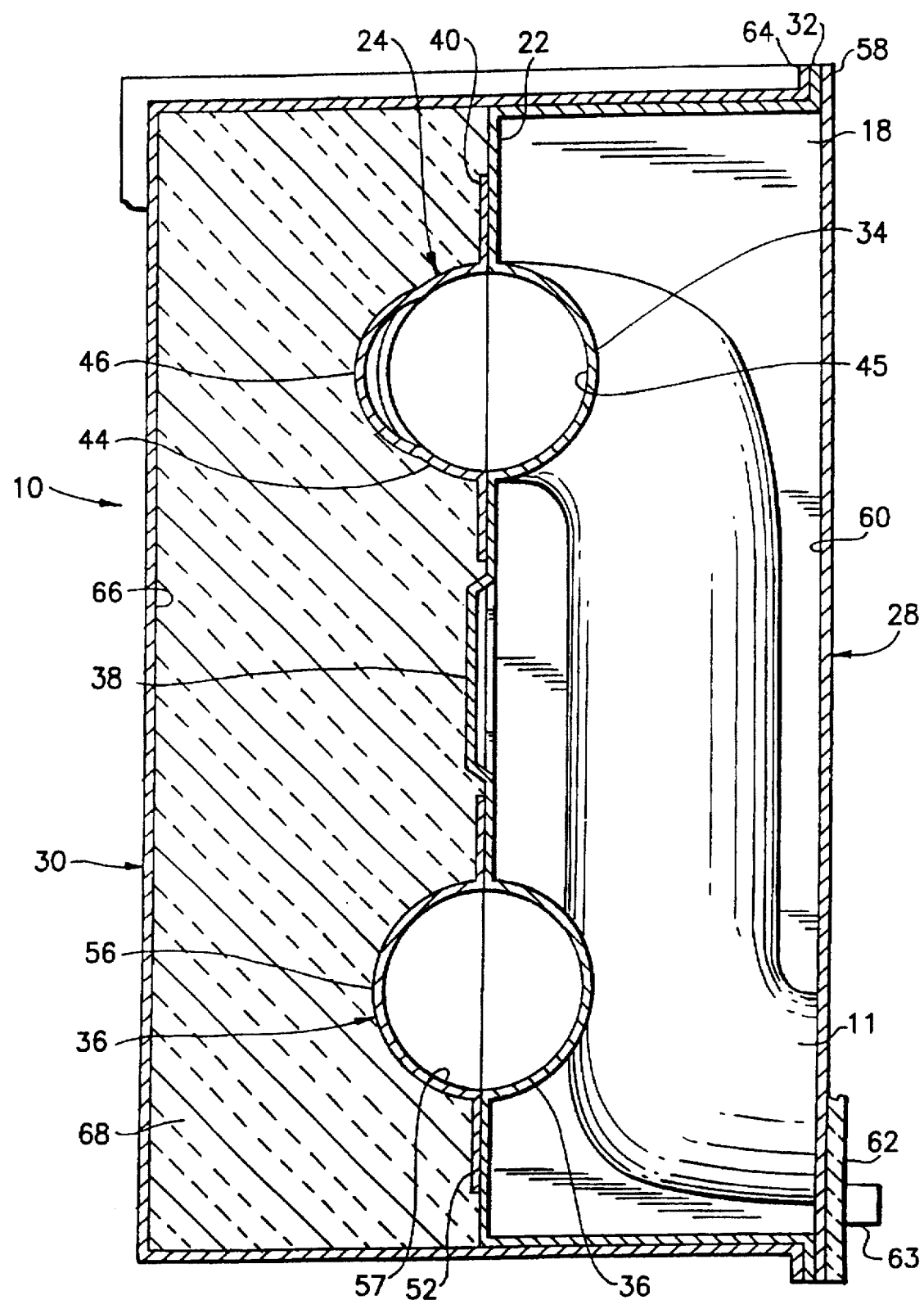
FIG. 4 is a cross-sectional view taken along line 4—4 in FIG. 3.

Internal components of the bumper/muffler assembly 10 are further illustrated schematically in FIGS. 3 and 4. In particular, the bumper/muffler assembly 10 includes an internal plate 22, inlet and outlet tube plates 24 and 26 respectively, a front external shell 28 and a rear external shell 30.

The internal plate 22 includes a peripheral flange 32 as shown most clearly in FIG. 4. Portions of the internal plate 22 spaced inwardly from the peripheral flange 32 are formed to define an inlet channel 34 and an outlet channel 36. The inlet channel 34 extends from the inlet 11 at one end 18 of the bumper/muffler assembly 10 and terminates at an opening 35 through the internal plate 22 near the second end 19 of the bumper/muffler assembly 10. The outlet channel 36 extends from an opening 37 through the internal plate 22 near the inlet 11 to the outlet 21 near the opposed end of the bumper/muffler assembly 10. The inlet and outlet channels 34 and 36 are substantially free of apertures between their respective ends in this embodiment of the muffler. However, portions of the internal plate 22 spaced from the inlet and outlet channels 34 and 36 are provided with an array of louvers 38 extending entirely therethrough. In other embodiments, perforations or other means for permitting gas communication across the internal plate 22 may be provided in place of the louvers illustrated herein.

The inlet tube plate 24 includes a peripheral flange 40 configured and dimensioned to register with portions of the internal plate 22 on opposed sides of the inlet channel 34. The inlet tube plate 24 further includes an inlet channel 44. The inlet channel 44 of the inlet tube plate 24 is configured to extend away from the inlet channel 34 of the internal plate 22 when the flanges 42 of the inlet tube plate 24 are secured in nested relationship with portions of the internal plate 22 on opposite sides of the inlet channel 34. Thus, an inlet tube 45 is defined between the inlet channels 34 and 44 as illustrated most clearly in FIG. 4. Portions of the inlet channel 44 on the inlet tube plate 24 are provided with an array of louvers 46.

The outlet tube plate 26 also is formed to include a peripheral flange 52 that is dimensioned and configured to nest with portions of the internal plate 22 adjacent the outlet channel 36 in the internal plate 22. Additionally, the outlet tube plate 24 includes an outlet channel 56. The outlet channel 56 is formed to extend away from the outlet channel 36 in the internal plate 22 when the flanges 52 of the outlet tube plate 26 are secured to the internal plate 22 to define an outlet tube 57. The channel 56 in the outlet tube plate 26 is substantially free of louvers, perforations or other aperture means.

The front external shell 28 includes a peripheral flange 58 dimensioned and configured to register with the peripheral flange 32 of the internal plate 22. Portions of the front external shell 28, as shown in FIGS. 3 and 4 are substantially planar and are in spaced relationship to portions of the internal plate 22 having the inlet channels 34 and 36 therein. In other embodiments, as explained and illustrated further herein, central portions of the front external shell 28 will assume a non-planar configuration conforming to the shape of the rear end 18 of the vehicle 14. In all such embodiments, a front chamber 60 is defined between the internal plate 22 and the front external shell 28. An insulating mat 62 may be secured to external surface regions of the front external shell 28 for heat insulation between the muffler 10 and the rear end 18 of the vehicle 14. Additionally, shock absorbers 63 are provided on vehicles that must meet low speed crash tests without damage to the vehicle. Mounting brackets and bolts may be used in place of shock absorbers in situations where crash protection is not needed.

The rear external shell 30 includes a peripheral flange 64 configured and dimensioned to register with the peripheral flanges 32 and 58 of the internal plate 22 and the external shell 28 respectively. Portions of the rear external shell 30 spaced inwardly from the peripheral flange 64 thereof are formed to lie in spaced relationship to the inlet and outlet tube plates 24 and 26 to define a rear chamber 66. An insulating material 68 preferably is disposed in the rear chamber 66 between the rear external shell 30 and the internal plate 22 and the inlet and outlet tube plates 24 and 26.

Exhaust gas enters the bumper/muffler assembly 10 through the inlet 11 to the inlet 45 defined by the inlet channels 34 and 44. The exhaust gas will travel substantially the length of the muffler 10 from one side 15 of the vehicle 14 substantially to the other side 16. As noted above, portions of the inlet tube 45 defined by the inlet channel 34 on the internal plate 22 are not perforated. However, portions of the inlet tube 45 formed by the inlet tube plate 24 include louvers 46 which permit the controlled expansion of exhaust gas into the rear chamber 66. Thus, a portion of the exhaust gas will flow from the inlet tube 45 into the rear chamber 66. This portion of the exhaust gas will flow from the rear chamber 66 to the front chamber 60 through the louvers 38 formed in the internal plate 22. Another portion of the exhaust gas will travel the length of the inlet tube 45 and will directly enter the front chamber 60 through the opening 35 near the second end of the bumper/muffler assembly 10. The relative proportions of exhaust gas taking these different paths can be varied by changing the size of the louvers 46 and the opening 35. These dimensional changes will be made in accordance with back pressure requirements and acoustical tuning needs for the particular vehicle. The exhaust gas will flow in the front chamber 60 toward the end 18 of the muffler 10 adjacent the inlet. The exhaust gas then will flow into the opening 37 in the outlet channel 36. The exhaust gas will continue through the outlet tube 57 defined by the outlet channels 36 and 56 and to the outlet 21 of the bumper/muffler assembly 10.

Figure 5:
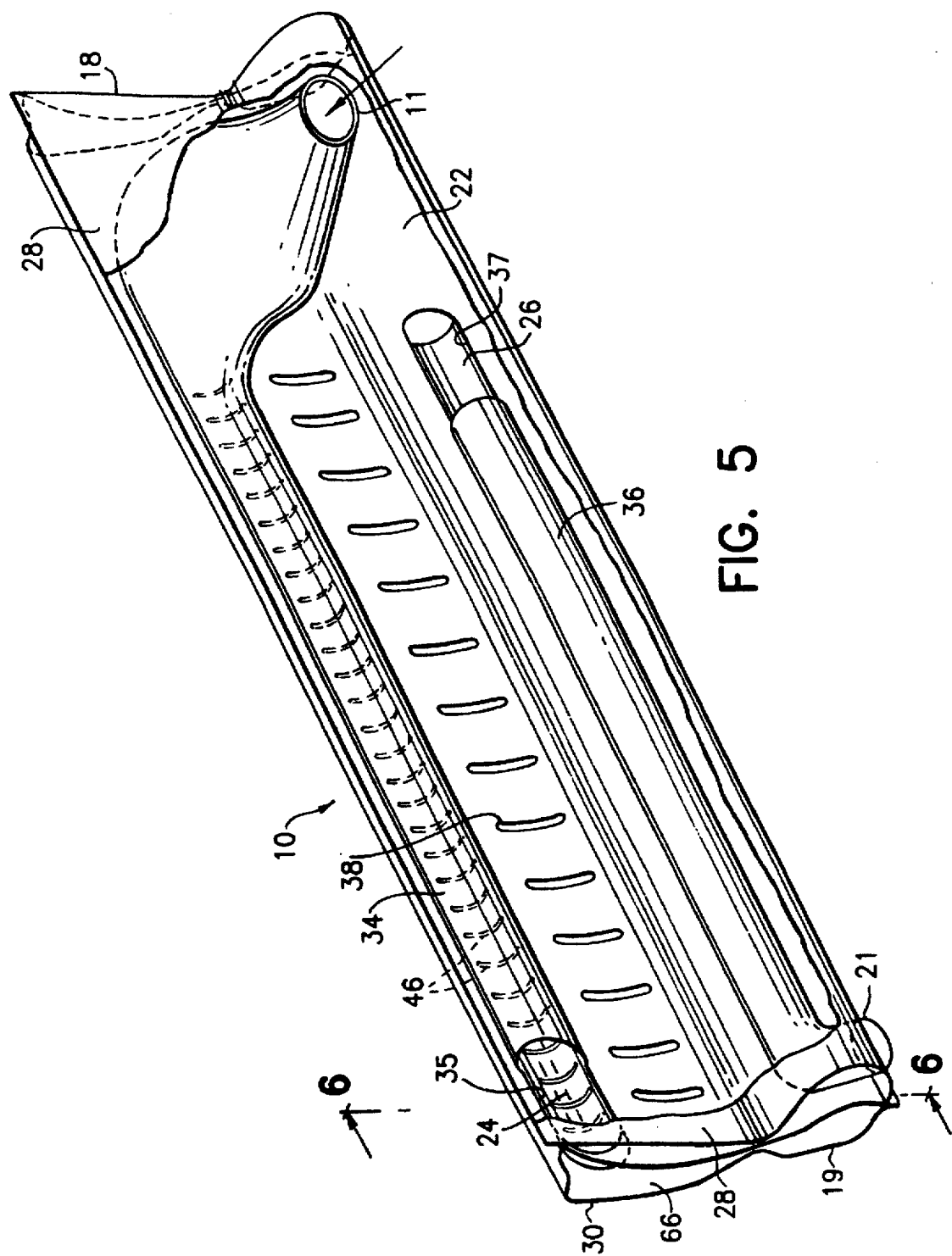
FIG. 5 is a perspective view of a preferred embodiment of a bumper/muffler in accordance with the subject invention.
Figure 6:
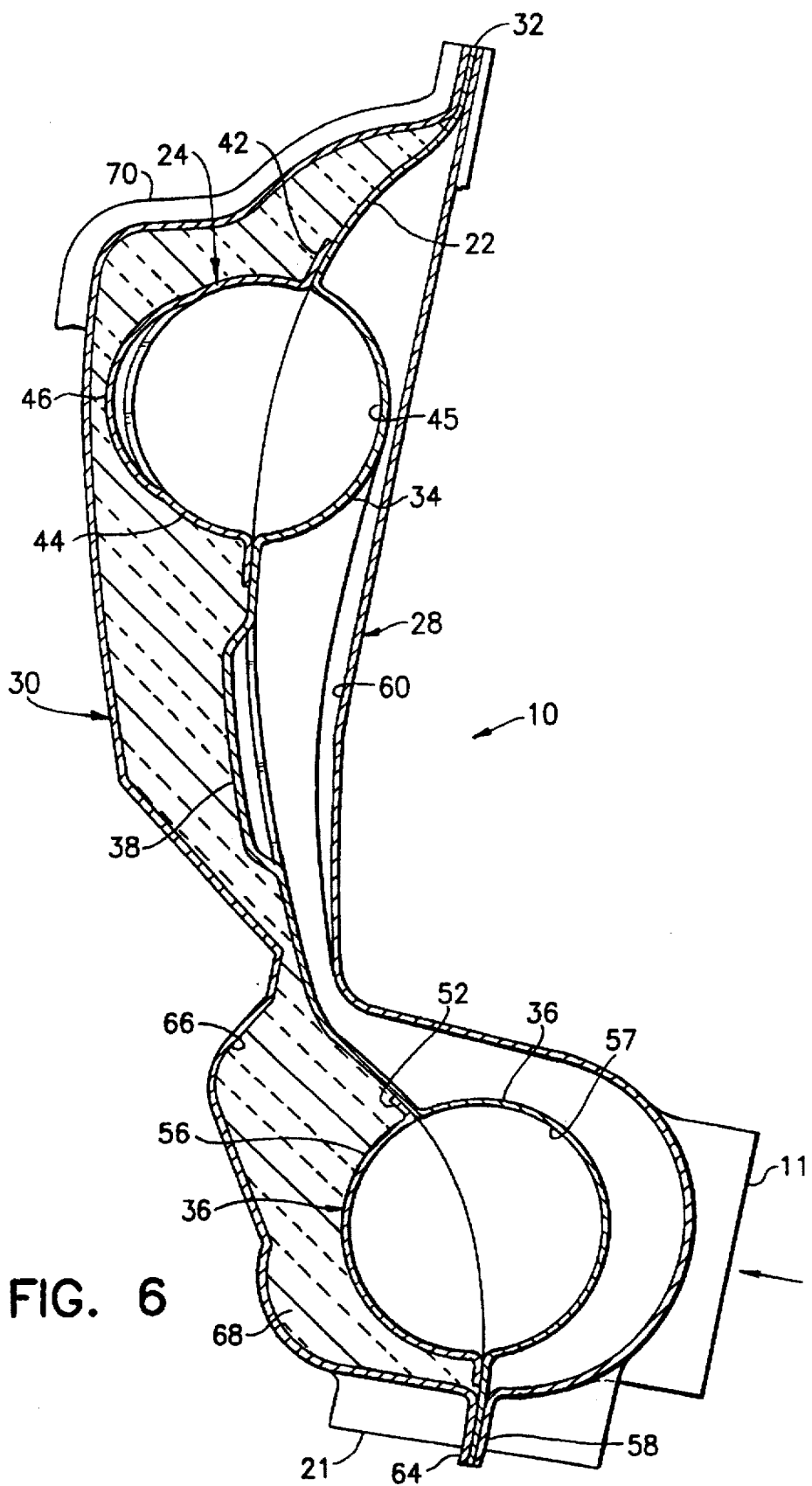
FIG. 6 is a cross-sectional view taken along line 6—6 in FIG. 5.
Figure 7:
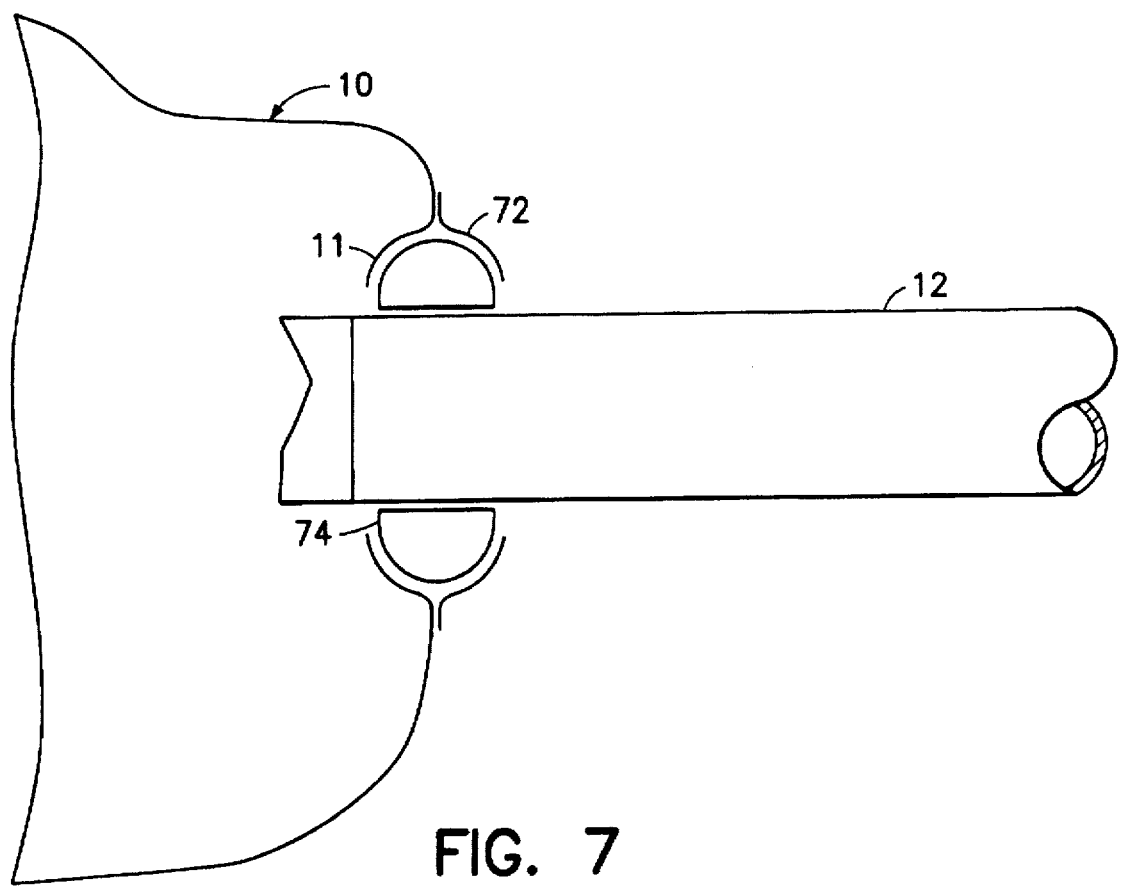
FIG. 7 is a cross-sectional view of a slip joint between the muffler and exhaust pipe.

FIGS. 5 and 6 illustrate a specific embodiment of a muffler in accordance with the schematic illustrations of FIGS. 3 and 4 as described above. For simplicity, corresponding numbers are used for the corresponding parts in both sets of figures.

With reference to FIGS. 5 and 6, the bumper/muffler assembly 10 includes an internal plate 22, an inlet tube plate 24, an outlet tube plate 26, a front external shell 28 and a rear external shell 30. The internal plate 22 includes a peripheral flange 32 extending entirely thereabout. Portions of the internal plate 22 spaced inwardly from the peripheral flange 32 define a non-planar shape that is dictated by the aesthetic and functional requirements of the bumper/muffler assembly 10. The internal plate 32 is formed to include an inlet channel 34 projecting convexly forwardly and extending substantially from one side of the vehicle to the other along substantially the entire length of the bumper/muffler assembly 10. Portions of the inlet channel 34 furthest from the inlet 11 and nearest to the end 19 of the bumper/muffler assembly 10 define an opening 35 from which a portion of the exhaust gas may flow. The internal plate 22 further include an outlet channel 36 which projects convexly forwardly and extends substantially from one side of the vehicle to the other along a major portion of the length of the bumper/muffler 10 assembly. Portions of the outlet channel 36 nearest the inlet 11 to the bumper/muffler assembly define a cut-out 37 for communication of exhaust gas. The opposed end of the outlet channel 36 is at the outlet 21 from the bumper/muffler assembly 10. Portions of the outlet channel 36 between its ends are substantially free of perforations. The internal plate 22 further is provided with louvers 38 extending entirely therethrough at spaced apart locations between the inlet and outlet channels 34 and 36.

The inlet tube plate 24 includes a flange 42 dimensioned and configured to nest with portions of the rear surface of the internal plate 22 substantially adjacent the inlet channel 34. The inlet tube plate 24 further is formed to include an inlet channel 44 that projects convexly rearwardly and that registers with the inlet channel 34 in the internal plate 22. Thus, an inlet tube 45 is defined between the inlet channels 34 and 44 as in the schematic illustrations of FIGS. 3 and 4. Portions of the inlet tube plate 24 defining the inlet channel 44 are provided with a plurality of louvers 46 for permitting a controlled expansion of exhaust gas from the inlet tube 45.

The outlet tube plate 26 includes a peripheral flange 52 that is dimensioned and configured to nest with portions of the rear surface of the internal plate 22 on opposite respective sides of the outlet channel 36. Portions of the outlet tube plate 26 inwardly of the flanges 52 define an outlet tube channel 56. The outlet tube channel 56 projects convexly rearwardly and registers with the outlet channel 36 to define an outlet tube 57 therebetween. The outlet channel 56 of the outlet tube 26 has no louvers comparable to those on the inlet tube plate 24.

The front external shell 28 includes peripheral flanges 58 dimensioned and configured to nest with the peripheral flange 32 of the internal plate 22. Portions of the front and external shell 28 inwardly for the peripheral flanges 58 are formed to nest with the particular shape of the rear end 17 of the vehicle 14. Additionally, portions of the front external shell 28 inwardly from the peripheral flanges 58 are configured to be in spaced relationship to the inlet channels 34 and 36 to define a front chamber 60. As illustrated most clearly in FIG. 6, the rear chamber assumes an unusual cross-sectional shape dictated substantially by the configuration of the rear end of the vehicle and the configuration of the rear face of the bumper, as controlled by aesthetic, safety and functional requirements. Additionally, as illustrated most clearly in FIG. 6, the rear chamber 60 is of very narrow depth in a front-to-rear direction. However, the front chamber 60 has a significant width corresponding to the height of the bumper/muffler assembly and a significant length, corresponding to the width of the vehicle. Thus, a large volume is provided by the front chamber 60 for achieving good noise attenuation with low back pressure.

The rear external shell 30 includes a peripheral flange 64 configured to nest with the external flange 32 of the internal plate 22. Portions of the rear external shell 30 spaced inwardly from the peripheral flange 64 thereof define an irregular shape dictated substantially by the aesthetic and functional requirements of the bumper. Additionally, portions of the rear external shell 30 spaced inwardly from the peripheral flange 64 thereof are configured to be in spaced relationship to the inlet and outlet tube plates 24 and 26. Thus, a rear chamber 66 is defined between the rear external shell 30 and the inlet and outlet tubes 45 and 57. As with the front chamber 60, FIG. 6 clearly shows the irregular configuration of the rear chamber 66 which is dictated substantially by the desired shape of the bumper. Although the rear chamber 66 defines a relatively small front-to-rear dimension, the rear chamber 66 defines a significant width, as measured from the top to the bottom of the bumper and a significant length as measured from one side of the vehicle to the other.

An insulating material 68 is disposed in the rear chamber 66 to provide both heat and noise insulation. Thus, the bumper/muffler assembly 10 can be touched while the vehicle is running to access material 70 in the trunk of the vehicle. Additionally, plastic material is molded to nest over the rear external shell 30 to provide a desired aesthetic appearance for the bumper/muffler assembly 10.

Exhaust gas flows through the bumper/muffler assembly 10 substantially as in the schematic embodiment depicted in FIGS. 3 and 4 and described above. More particularly, exhaust gas will enter the inlet 11 and will flow through the inlet tube 45 substantially from one side of the vehicle to the other along the length of the bumper/muffler assembly 10. Exhaust gas will expand through the louvers 46 and into the rear chamber 66. Exhaust gas entering the rear chamber 66 will flow through the louvers 38 and into the front chamber 60. Other portions of the exhaust gas will continue along the length of the inlet tube 45 and will enter the front chamber 60 through the opening 35 in the portions of the internal plate 22 at the end of the inlet tube 45. Exhaust gas will flow through the front chamber 60 toward the end 18 of the bumper/muffler assembly 10 adjacent the inlet 11. The exhaust gas will then enter the outlet tube 57 and flow to the outlet 21 and tail pipe 20.

The exhaust pipe 12 from the engine will undergo significant thermal expansion while the engine is running and will then contract when the engine is shut off. To accommodate these dimensional changes of the exhaust pipe, the bumper/muffler assembly 10 includes a retaining ring 72 formed around the inlet 11. An annular GRAFFOIL seal 74 is trapped at the inlet 11 by the retaining ring 72. The exhaust pipe 12 passes through the seal 74 and into the bumper/muffler 10 at the inlet 11 for communication with the inlet tube 45 defined by the internal plate 22 and the inlet tube plate 24. The seal 74 provides an adequate moisture and gas barrier and permits thermal expansion and contraction of the exhaust pipe 12.

While the invention has been described with respect to a preferred embodiment, it is apparent that various changes can be made without departing from the scope of the invention as defined by the appended claims. For example, the muffler can take many other shapes depending upon the structural configuration at the rear of the vehicle and the shape desired for visible portions of the bumper. Additionally, a second internal plate may be provided if needed to accommodate acoustical tuning needs. For example, an internal chamber may be defined between the internal plates. One internal plate may define portions of an inlet tube, while the other internal plate may define portions of an outlet tube. Other means for accommodating gas communication and thermal expansion of the exhaust pipe relative to the muffler may be provided. Furthermore, the external shells have been defined as being front and rear external shells. However, the bumper/muffler assembly may be oriented such that the external shells define a top and a bottom respectively. These and other variations will be apparent to persons skilled in the art after reading the subject disclosure.

What is claimed is:

1. A bumper/muffler assembly for a vehicle, said vehicle having a rear end and opposed sides, said assembly comprising:

internal plates secured in nested relationship to one another and formed to define at least one inlet tube, at least one outlet tube, and opening means for permitting exhaust gas communication from said inlet tube to said outlet tube;

first and second external shells secured in surrounding relationship to said internal plates and being formed respectively to define first and second chambers surrounding and enclosing said opening means in said internal plates, said external shells being dimensioned and configured for mounting to said rear end of said vehicle and for extending substantially from one said side of said vehicle to the other; and mounting means secured to at least one of said first and second external shells for secure mounting of said bumper/muffler assembly to said rear end of said vehicle.

2. The bumper/muffler assembly of claim 1, further comprising heat insulating material in at least one of said chambers.

3. The bumper/muffler of assembly claim 1, further comprising a heat insulating material secured exteriorly of said bumper/muffler assembly adjacent at least one said external shell and said rear end of said vehicle.

4. The bumper/muffler assembly of claim 1, further comprising a plastic material nested over at least one of said external shells for aesthetic appearance and scratch resistance of said bumper/muffler assembly.

5. The bumper/muffler assembly of claim 1, further comprising a slip joint at the inlet of said muffler for accommodating an exhaust pipe and for permitting thermal expansion of said exhaust pipe relative to said bumper/muffler assembly.

6. The bumper/muffler assembly of claim 1, wherein the opening means in said internal plate is defined by a plurality of louvers.

7. The bumper/muffler assembly of claim 1, wherein the internal plates comprise a first internal plate having inlet and outlet channels formed therein, an inlet tube plate registered with the inlet channel for defining the inlet tube and an outlet tube plate registered with the outlet channel for defining the outlet tube.

8. The bumper/muffler assembly of claim 7, wherein the inlet tube plate includes opening means for permitting exhaust gas expansion.

9. The bumper/muffler assembly of claim 1, wherein the mounting means comprises shock absorbers for mounting the bumper/muffler assembly to the rear end of the vehicle.

10. A bumper/muffler assembly for a vehicle, said vehicle having a rear end and opposed sides, said assembly comprising:

internal plates securely nested with one another and formed to define at least one inlet tube and at least one outlet tube therebetween, and opening means formed through at least one said internal plate for accommodating flow of exhaust gas between said inlet and outlet tubes;

a front external shell secured to at least one said internal plate and formed to define a front chamber surrounding at least said inlet and outlet tubes, said front internal plate being dimensioned and configured for mounting in substantially juxtaposed relationship to said rear end of said vehicle and for extending from substantially one side of said vehicle to the other;

a rear external shell secured to at least one said internal plate and being formed to define a rear chamber surrounding at least portions of said inlet and said outlet tubes;

heat insulating material disposed adjacent said rear external shell;

a plastic material secured to and substantially covering at least said rear external shell; and mounting means secured to at least said front external shell for securely mounting said bumper/muffler assembly to said rear end of said vehicle.

11. The bumper/muffler assembly as in claim 10, further comprising heat insulating material disposed adjacent said front external shell.

12. The bumper/muffler assembly of claim 10, wherein said mounting means comprise shock absorbers for permitting movement of said bumper/muffler assembly relative to said rear end of said vehicle.

13. The bumper/muffler assembly of claim 10, wherein said vehicle includes an exhaust pipe extending to said bumper/muffler assembly, said bumper/muffler assembly further including a slip joint for accommodating thermal expansion of said exhaust pipe relative to said bumper/muffler assembly.

14. The bumper/muffler assembly of claim 13, wherein the slip joint includes a retaining ring secured to at least one said external shell and an annular seal retained in surrounding relationship to said exhaust pipe by said retaining ring, said seal accommodating thermal expansion of said exhaust pipe relative to said bumper/muffler assembly.

* * * * *